3,160,490
APPARATUS FOR THE CONTINUOUS PURIFICATION OF URANIUM HEXAFLUORIDE
Claude Fabre, L'Hay-les-Roses, and Jean-Claude Martin, Paris, France, assignors to Commissariat à l'Energie Atomique, Paris, France
Filed Aug. 1, 1960, Ser. No. 46,492
Claims priority, application France, Aug. 14, 1959, 802,815
11 Claims. (Cl. 62—33)

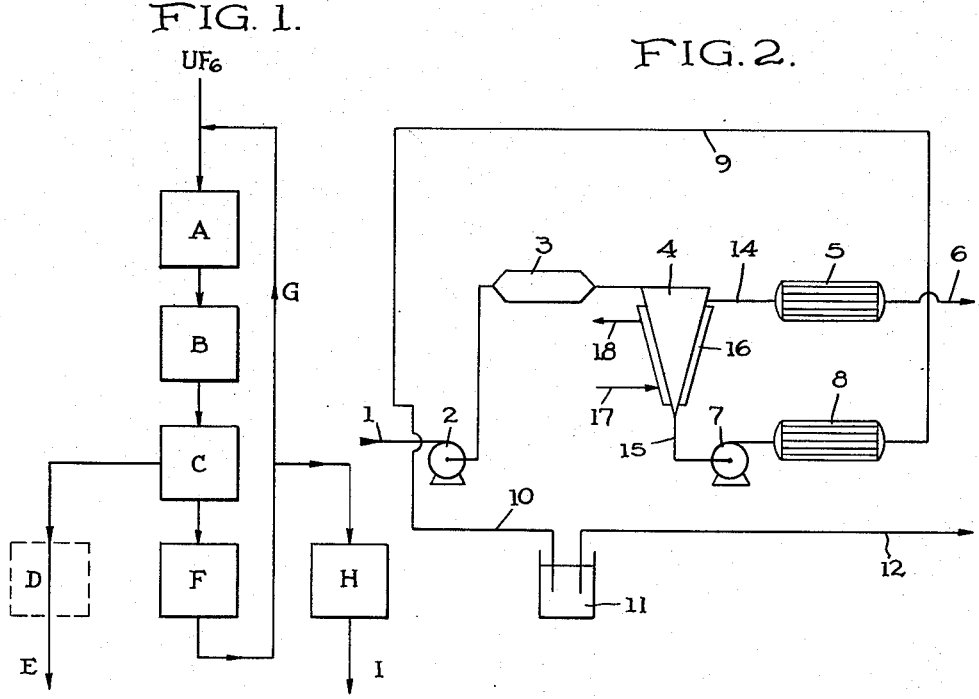
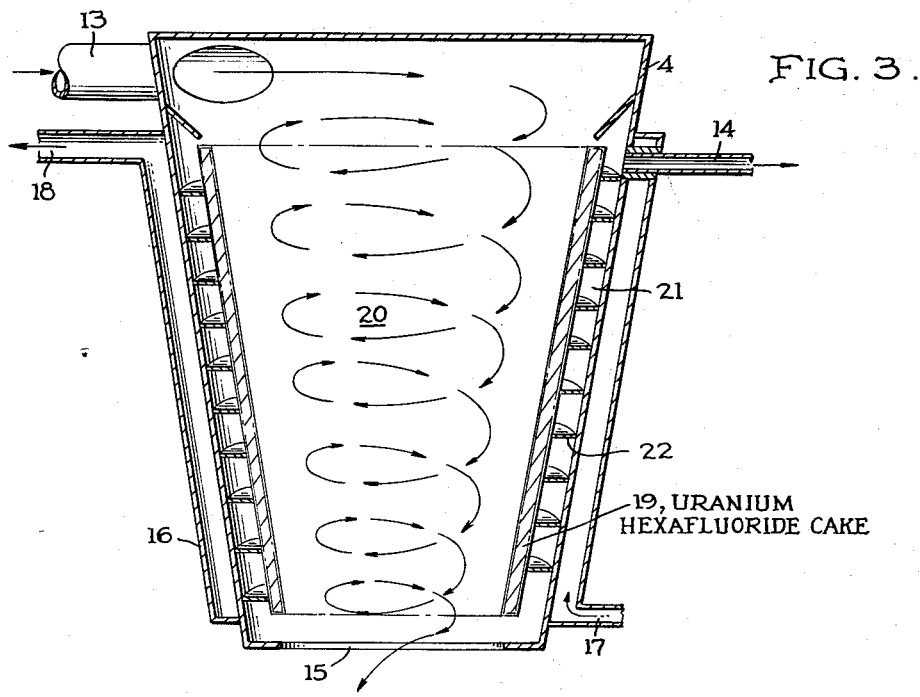

The present invention relates to an apparatus for the continuous purification of uranium hexafluoride in the form of an impure gaseous current.

The use of uranium hexafluoride requires a particular technology in order to avoid any escape of this corrosive and dangerous material. It is therefore necessary, and particularly in the passages of rotating shafts, pumps and compressors, to prevent escapes of uranium hexafluoride by the interposition, between this material and the exterior atmosphere, of an inert gas such as nitrogen.

During its use, uranium hexafluoride becomes contaminated with impurities, such as nitrogen, the rare gases and fluorine derived from its partial decomposition. It is therefore necessary to purify it before it is recycled.

The invention consists in cooling an impure gaseous current of uranium hexafluoride in order to cause the formation of crystals of $UF_6$, separating these crystals from the gas which accompanies them, contacting them with a sufficiently hot surface to cause their sublimation and recovering purified gaseous uranium hexafluoride formed during the course of the sublimation, all the operations being conducted continuously.

Preferably, the cooling of the gaseous current to be purified is effected by an adiabatic expansion producing work.

It is also very desirable, in accordance with a preferred feature of the invention, to allow the crystals formed during the adiabatic expansion to grow before separating them from the gas; this growth is advantageously obtained by passing the gas containing small crystals in suspension into a sufficiently large expansion space.

According to a very important embodiment, the gaseous fluid accompanying the crystals and containing the impurities is separated from the crystals by centrifugation in a cyclone process.

Preferably, the sublimation is effected at the same time as the separation.

The gas from which the crystals of $UF_6$ have been separated contains the impurities of the initial gaseous currents and a non-crystallised part of the $UF_6$. According to a preferred form of the invention, this gas in its turn is recompressed and recooled to be recycled to the initial gaseous current to be purified, for which purpose it is restored to the pressure and temperature of the latter. A fraction of the gas thus recycled is continuously eliminated (purged) to remove the impurities.

The apparatus provided for effecting simultaneous separation by centrifugation and sublimation is a subliming cyclone constituted by a conical frustum, the large end of which, carrying a tangential inlet for the gaseous fluid, and the small end of which, constituting the outlet for the gaseous fluid containing impurities, have surfaces in the ratio of the amounts of gaseous fluid entering and leaving; the lateral walls of the cyclone comprise a double envelope where a hot fluid circulates, at least one pipe, located at the apex of the conical frustum, being provided for the outlet of the pure uranium hexafluoride.

The invention also contemplates the following preferred points taken separately or in combination:

(1) The operations of cooling and expansion of the gaseous fluid entering the apparatus for purification are effected in a turbine where an adiabatic expansion takes place with the production of work.

(2) The growth of the crystals of uranium hexafluoride is effected in an expansion chamber.

(3) The re-pressurisation of the gaseous fluid containing all the impurities and a non-crystallised part of the uranium hexafluoride takes place in a compressor.

(4) The cooling of the gaseous fluid leaving the compressor is effected in a temperature exchanger which lowers the temperature of the gaseous fluid leaving the compressor to that of the gaseous fluid to be purified.

(5) The expansion turbine and the compressor are coupled together.

(6) The subliming cyclone comprises on its lateral internal walls a spiral coil of inverse sense to the rotation of the gaseous fluid inside the subliming cyclone.

(7) The heat required for the sublimation of the crystals of uranium hexafluoride is all provided by heating the walls of the subliming cyclone.

(8) The heat required for the sublimation of the crystals of uranium hexafluoride is provided partly by heating the walls of the subliming cyclone and partly by a superheater located in the uranium hexafluoride outlet by the subliming cyclone.

(9) The super heater located in the pure uranium hexafluoride circuit is constituted, at least partly, by a heat-exchanger located at the outlet of the compressor in the recycling circuit for the gaseous fluid containing the impurities.

(10) The discharge of the pure uranium hexafluoride from the subliming cyclone is effected either by pumping or by the creation of a cold spot.

This process has the considerable advantage of being continuous and of being readily adaptable by branching at any point in the circuit for the gaseous uranium hexafluoride. It is particularly economical, moreover, the power necessary being to a large extent furnished by the gaseous fluid itself.

Its use is not otherwise limited to the purification of uranium hexafluoride, but extends to any separation or any gaseous impurities incondensable at temperatures and pressures of liquifaction or solidification of the principal gaseous fluid or of any gaseous fluid incondensable at temperatures and pressures of liquifaction or solidification of the impurities.

In the case of the purification of uranium hexafluoride, it is necessary to carry it out before the molar percentage of the impurities exceeds 10. In general, molar percentages of 2 to 6 are employed. To obtain these performances, it is necessary after expansion and cooling of the gaseous fluid, only to crystallise a part of the uranium hexafluoride and the molar ratio of recycling to the pure uranium hexafluoride obtained is 25.

The economy of the process gives the possibility of coupling together the turbine providing the expansion and cooling of the gaseous fluid and the compressor which follows the subliming cyclone. The balance of the power for furnishing this coupling, which power corresponds to the heat removed by the heat exchanger following the compressor, represents about 15 to 20% of the power developed in the turbine. The sole supplementary power requirement is represented by the heat supplied by the hot fluid circulating in the double envelope of the walls of the subliming cyclone. It is still further possible to diminish this requirement by furnishing a part of the power in a superheater located at the outlet for the pure uranium hexafluoride from the subliming cyclone; such a superheater can be partly or wholly formed by the heat exchanger located at the outlet of the compressor.

The considerable degree of originality of the process resides in the subliming cyclone which effects a continuous separation of the impurities from the uranuim hexafluoride, by the combination of the phenomenon of centrifugation and the phenomenon of sublimation. In fact, during the spiral travel of the gaseous fluid inside the subliming cyclone, the crystals of uranium hexafluoride are projected on to the walls; the phenomenon of sublimation which occurs, on contact of the crystals with the hot walls, leads partly to an agglomeration of the crystals which form a truncated conical cake and partly to a sublimation of crystals of uranium hexafluoride. All this occurs continuously as the uranium hexafluoride cake enlarges at the inside and diminishes at the exterior. This cake thus forms a thermal screen between the hot sublimation zone and the cold centrifugation zone where the gaseous fluid containing the impurities is located. As the pressure of gas in the sublimation zone is much greater than that of the gaseous fluid containing the impurities, these cannot in any way pollute the uranium hexafluoride produced by sublimation; the cake of uranium hexafluoride, which does not adhere to the hot walls since it is separated by the gaseous film produced by the sublimation, undergoes rotation in the sense of rotation of the gaseous fluid; this rotation favours the homogeneity of the sublimation.

In the case where the heat required for the sublimation of the uranium hexafluoride crystals is all supplied by heating of the lateral walls of the subliming cyclone, pure gaseous uranium hexafluoride leaves the subliming cyclone.

In the case where this heat is supplied partly by heating the lateral walls of the subliming cyclone and partly by a superheater, sublimation at the level of the walls is only partial and a mist of uranium hexafluoride crystals dispersed in gaseous uranium hexafluoride leaves the subliming cyclone, total vaporisation of this mist being effected by the superheater.

Referring to FIGS. 1, 2 and 3 of the accompanying drawings, there is described below, by way of example, an embodiment of the process and apparatus for the continuous purification of uranium hexafluoride by centrifugation and sublimation in accordance with the invention. The devices which are described in connection with this example can be considered as forming part of the invention, it being understood of course that all equivalent devices can also be used without exceeding the scope thereof.

FIG. 1 represents a general scheme for the process in accordance with the invention;

FIG. 2 represents an installation for carrying out the process according to the invention;

FIG. 3 shows a diagrammatic section of a subliming cyclone according to the invention.

The various stages of the process are shown in FIG. 1.

The uranium hexafluoride to be purified is first cooled and expanded at A; then, after partial crystallisation obtained by this operation, the crystals of uranium hexafluoride are made to grow at B. In a third stage, these crystals are separated at C, by contrifugation and sublimation of the gaseous fluid, in the form of a gas or mist; in the latter case, a superheating at D converts the mist to the gaseous state; pure $UF_6$ is recovered at E; the gaseous fluid containing the impurities derived from the separation is restored at F to a temperature and pressure similar to those of the uranium hexafluoride which it is desired to purify and is then recycled by G to A; a partial purge is effected in the recycling circuit in order to eliminate the impurities; a trap, at H for the traces of uranium hexafluoride entrained by the impurities allows them to be eliminated without danger at I.

FIG. 2 shows the inlet 1 for the uranium hexafluoride to be purified, the turbine 2, the expansion chamber 3, the subliming cyclone 4, the superheater 5, the outlet 6 for pure uranium hexafluoride, the compressor 7, the exchanger 8, the recycling circuit 9, the purge circuit 10, the trap 11 and the outlet 12 for the impurities.

In FIG. 3, the subliming cyclone 4 is shown which comprises a tangential inlet 13 for gaseous fluid containing in suspension crystals of uranium hexafluoride, an outlet 14 for pure uranium hexafluoride and an outlet 15 for the gaseous fluid. This cyclone 4 is surrounded by a double envelope 16 where a hot fluid circulates, entering by a pipe 17 and leaving by a pipe 18, for supplying to the wall of the cyclone the heat necessary for the sublimation of the cake 19 of uranium hexafluoride which forms a screen between a central zone 20, where the gaseous fluid undergoes rotation in a descending rotary spiral, and a lateral zone 21, where the sublimation occurs. A helix 22, having an opposite direction to the direction of rotation of the gas in zone 20, is mounted on the inner surface of cyclone 4.

Operation of the installation shown in FIGS. 2 and 3 is as follows:

The gaseous uranium hexafluoride charged with gaseous impurities, such as nitrogen and also the rare gases and fluorine, is passed into the turbine 2 where it is subjected to an adiabatic expansion with work. This expansion should be very rapid, in order that crystallisation of a part of uranium hexafluoride, due to cooling corresponding to the expansion of the gaseous fluid, is only produced at the outlet of the turbine, in order not to cause frosting thereof. The minute crystals of uranium hexafluoride are entrained by the gaseous fluid. In order to effect separation of these crystals from the gaseous fluid, it is very advantageous to make them larger, which is done in the expansion chamber 3, where the mist resolves into larger crystals of uranium hexafluoride. These are then entrained by the gaseous fluid into the cyclone separator, where they enter via the tangential inlet 17 which subjects the gaseous fluid to rotation in a descending spiral inside the subliming cyclone 4. During the rotation of the gaseous fluid, the crystals of uranium hexafluoride are projected on to the hot walls of the subliming cyclone 4, thus forming a cake 19. The cake 19, if it becomes larger on the internal face, is gradually sublimed from the external face thereof. This sublimation creates in the lateral zone 21 a gaseous uranium hexafluoride pressure, which has two effects: the first effect is to maintain the cake 19 in suspension without any contact with the walls of the subliming cyclone 4; the second effect is to prevent all contamination of the thus-formed gaseous uranium hexafluoride by the gaseous impurities, which remain in the central zone 20. As the cake 19 has no point of contact with the hot walls of the subliming cyclone 4, it is rotated by the gaseous fluid. This rotation of the cake 19 permits a considerable degree of homogeneity of sublimation to be obtained on all its surface in contact with the lateral zone 21. To perfect the homogeneity, the internal part of the lateral walls of the separator cyclone 4 can be provided with a spiral coil in the reverse sense to the rotation of the gaseous fluid flowing in the zone 20. This coil, not shown in the drawings, subjects the hot pure uranium hexafluoride gas to reverse rotation relative to the rotation of the cake 19, which while participating in the rotation of the cake 19, facilitates an efficient leaching of the external face of the cake 19, thus giving homogeneous sublimation, and also permits pure gaseous uranium hexafluoride to be recovered at a single high point 14 of the subliming cyclone 4.

The cake 19 of uranium hexafluoride thus plays the part of a thermal screen and so prevents heat radiating from the walls of the subliming cyclone 4 from disturbing the centrifugation of the crystals of uranium hexafluoride in the central zone 20.

The gaseous fluid containing the impurities and a large part of the non-crystallised uranium hexafluoride leaves the subliming cyclone 4 by the aperture 15 and passes into the compressor 7 which restores it to the pressure which it had when entering at 1. As this compression overheats the fluid, the exchanger 8 returns its temperature to the temperature which it had while entering at 1. It is thus recycled at 1. The circuit of the fluid, in relation to the exchange of heat with the circuit 15, 7, 9, is not shown in the drawing.

The separation by sublimation of pure uranium hexafluoride can be carried out in two different ways. In the first place, all the heat necessary for the sublimation of the cake 19 is furnished by a hot fluid circulating in the double envelope 16, entering through the aperture 17 and leaving through the aperture 18, and pure gaseous uranium hexafluoride is recovered at 14. In the second case, only a part of the heat is supplied by the hot fluid circulating in the double envelope 16, in an amount just sufficient to produce a mist of pure uranium hexafluoride crystals dispersed in pure gaseous uranium hexafluoride. It is suitable in this latter case to complete sublimation of the pure uranium hexafluoride crystals before returning them to the circuit for use. For this purpose, after the subliming cyclone 4, a superheater 5 is disposed in the circuit for the pure uranium hexafluoride. The heat supplied by the superheater 5 can partly or wholly be provided by the exchanger 8 (the fluid heating circuit of the superheater 5 is not shown). This coupling of the superheater 5 with the exchanger 8, which completes coupling of the compressor 7 with the expansion turbine 2, permits a very considerable economy of power to be imparted to the process, the work produced by the turbine being used to operate the compressor. The pure uranium hexafluoride then leaves at 6 ready to be sent to the circuit for use.

To facilitate discharge of pure uranium hexafluoride from the subliming cyclone 4, either a pump or a cold spot can be used.

The recycling circuit 9 comprises a purge 10 which, through a trap 11 intended to retain traces of uranium hexafluoride, removes the gaseous impurities at 12.

Thus, for example, to purify uranium hexafluoride containing a molar percentage of impurities of 3, with an installation comprising a combination of the turbine 2 with the compressor, but not comprising the superheater 5, operation occurs in the following conditions:

At 1, the gaseous fluid has a temperature of 60° C. and a pressure of 30 cm. Hg;

At the outlet of the turbine 2, its temperature is —10° C. and the pressure is 7.5 cm. Hg;

The walls of the subliming cyclone 4 are heated to 150° C.;

At the outlet at 14, the pure uranium hexafluoride has a temperature of 70° C. and a pressure of 75 cm. Hg;

At the outlet of the compressor 7, the gaseous fluid recycled has a temperature of 80° C. and a pressure of 30 cm. Hg;

To return to its temperature of 50° C., the exchanger 8 comprises 400 tubes 1.1 m. in length and 20 mm. in diameter;

The dimensions of the cyclone are: height, 3 mm.; average diameter, 0.5 mm.;

The power to be furnished through the turbine 2/compressor 7 assembly is 17% of the power provided by the turbine 2;

The molar ratio of the amount of gaseous fluid recycled to the amount of pure uranium hexafluoride is 25.

In a variation of the installation comprising a superheater 5, ¾ of the power for heating is supplied by it and thus the heating surface of the cyclone 4 is divided by four.

We claim:

1. In apparatus for the purification of gaseous sublimable material, means for cooling the gas and crystallizing the component to be separated, a conical cyclone separator, lateral walls for said separator, means for bringing the gas and crystals to said separator, a tangential upper inlet in said separator for the gas and crystals, a lower central outlet in said separator for the gas, a peripheral upper outlet in said separator for the sublimated crystals, external means for heating said lateral walls for sublimating the crystals on contact with said walls and for forming an agglomerated crystal shield between the gas and crystals in said separator flowing down toward said lower outlet, the sublimated crystals flowing up to said peripheral outlet and means for recycling the substantially crystal-free gas to said cooling means.

2. Apparatus according to claim 1, in which the cooling means comprise a turbine for adiabatic expansion with the production of work.

3. Apparatus according to claim 1, in which an expansion chamber is connected to the communication between the cooling means and the separator.

4. Apparatus according to claim 1, in which the heating means for the separator comprise a double truncated conical envelope surrounding the walls of said separator and provided with tubes for the inlet and outlet of a heating fluid.

5. Apparatus according to claim 1, in which said outlet for the heating fluid communicates with the interior of a superheater.

6. Apparatus according to claim 1, in which said lower outlet of said separator communicates with a compressor.

7. Apparatus according to claim 6, in which said cooling means comprising a turbine for adiabatic expansion with the production of work and driving means for said compressor coupled with driving means for said turbine.

8. Apparatus according to claim 6, in which the outlet of the compressor communicates with the interior of a heat exchanger, the outlet of which is connected with the inlet to said cooling means for cooling the gas and with a purge device.

9. Apparatus according to claim 8 in which the circuit of the heat exchanger, in relation to the exchange of heat with the circuit communicating with the interior of the compressor, is connected to the supplementary peripheral outlet of the cyclone separator.

10. Apparatus according to claim 1, in which the internal walls of said separator are provided with a helical coil of inverse sense to the rotation which said separator imparts to the gas passing through it.

11. In apparatus for the purification of gaseous sublimable material, a turbine for adiabatic expansion and cooling of the gas with the production of work and for crystallising the component to be separated, an expansion chamber connected to said turbine, a conical cyclone separator connected to said expansion chamber, a helix in said separator of inverse direction to the rotation which said separator imparts to the gas passing through it, lateral walls for said separator supporting said helical coil, a tangential upper inlet in said separator for the gas and crystals, a lower central outlet in said separator for the gas, a peripheral upper outlet in said separator for the sublimated crystals, external means for heating said lateral walls comprising a truncated conical envelope surrounding the walls of said separator, inlet and outlet tubes for a heating fluid for said envelope, the crystals being sublimated on contact with said walls and forming an agglomerated crystal shield between the gas and crystals in said separator flowing down toward said lower outlet, the sublimated crystals flowing up to said peripheral outlet, a superheater connected to said peripheral outlet, a compressor connected to said lower outlet, driving means for said compressor, driving means for said turbine coupled to said driving means for said compressor and a heat exchanger connected to said compressor, said heat exchanger being connected to said turbine.

References Cited by the Examiner

UNITED STATES PATENTS

| | | | |
|---|---|---|---|
| 1,822,221 | 9/31 | Jones | 55—459 XR |
| 2,010,128 | 8/35 | Arnold | 55—459 XR |
| 2,011,551 | 8/35 | Hasche | 62—38 XR |
| 2,431,866 | 12/47 | Dennis | 62—13 XR |
| 2,537,045 | 1/51 | Garbo | 62—13 |
| 2,929,691 | 3/60 | Decroly | 23—273 |
| 2,944,878 | 7/60 | Jacque | 23—294 |

NORMAN YUDKOFF, *Primary Examiner.*

MAURICE A. BRINDISI, *Examiner.*